US009457783B2

(12) United States Patent
Kotake et al.

(10) Patent No.: US 9,457,783 B2
(45) Date of Patent: Oct. 4, 2016

(54) BRAKE SYSTEM

(71) Applicant: HITACHI AUTOMOTIVE SYSTEMS, LTD., Ibaraki (JP)

(72) Inventors: Tomoyuki Kotake, Kanagawa (JP); Wataru Yokoyama, Kanagawa (JP); Kenichiro Matsubara, Ibaraki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/136,340

(22) Filed: Dec. 20, 2013

(65) Prior Publication Data

US 2014/0188362 A1 Jul. 3, 2014

(30) Foreign Application Priority Data

Dec. 28, 2012 (JP) .................................. 2012-287022

(51) Int. Cl.
*B60T 13/74* (2006.01)
*B60T 7/12* (2006.01)
*F16D 65/18* (2006.01)
*F16D 125/40* (2012.01)

(52) U.S. Cl.
CPC ................ *B60T 13/741* (2013.01); *B60T 7/12* (2013.01); *F16D 65/18* (2013.01); *F16D 2125/40* (2013.01)

(58) Field of Classification Search
CPC .... B60T 13/74; B60T 13/741; B60T 13/743; B60T 13/745; B60T 13/746; B60T 13/748; B60T 7/12; F16D 65/18; F16D 2125/40
See application file for complete search history.

(56) References Cited

U.S. PATENT DOCUMENTS

| 4,629,043 A | * | 12/1986 | Matsuo et al. ................. 477/184 |
| 6,019,436 A | * | 2/2000 | Siepker ....................... B60T 7/12 |
| | | | 188/106 F |
| 6,397,981 B1 | | 6/2002 | Tamasho et al. |
| 2002/0023818 A1 | * | 2/2002 | Yanaka ....................... B60T 7/02 |
| | | | 192/219.4 |
| 2007/0170775 A1 | * | 7/2007 | Uchimura ............... B60T 7/107 |
| | | | 303/112 |
| 2008/0053760 A1 | * | 3/2008 | Oikawa ................. B60T 13/745 |
| | | | 188/72.4 |

FOREIGN PATENT DOCUMENTS

| JP | 2001-80495 | | 3/2001 |
| JP | 2006-137218 | | 6/2006 |
| JP | 2007-216896 | | 8/2007 |
| JP | 2007216896 A | * | 8/2007 |

OTHER PUBLICATIONS

Office Action issued Apr. 26, 2016 in Japanese patent application No. 2012-287022 (with partial English translation).

* cited by examiner

*Primary Examiner* — Aaron L Troost
(74) *Attorney, Agent, or Firm* — Wenderoth, Lind & Ponack, L.L.P.

(57) ABSTRACT

A disk brake is configured as a brake apparatus provided with an electric parking brake function capable of holding braking of a vehicle by driving an electric actuator. A parking brake control apparatus, which controls the electric actuator, actuates the electric actuator so as to release holding of the braking upon determining that the vehicle is in a running state. More specifically, if a speed of the vehicle is maintained at a speed higher than 0 km/h for a predetermined time period, the parking brake control apparatus actuates a rotation/linear motion conversion mechanism by the electric actuator so as to release the holding of the piston of the disk brake.

15 Claims, 4 Drawing Sheets

BRAKE SYSTEM

BACKGROUND OF THE INVENTION

The present invention relates to a brake system preferably used to apply a brake force on a vehicle such as an automobile.

As a brake system mounted on a vehicle such as an automobile, for example, Japanese Patent Application Public Disclosure No. 2007-216896 discloses an electric parking brake apparatus configured to apply a parking brake by an electric actuator.

The electric parking brake apparatus disclosed in Japanese Patent Application Public Disclosure No. 2007-216896 is configured to allow the parking brake to be released provided that a brake pedal is operated (pressed), for example, when the system stops due to a reduction in a voltage of a power source while the parking brake is being released, and the system recovers immediately after that, as illustrated in FIG. 6 of this application.

According to the technique discussed in Japanese Patent Application Public Disclosure No. 2007-216896, if the brake pedal is not pressed when the system has recovered, a vehicle is allowed to run with release of the parking brake remaining uncontrolled even if the release of the parking brake is uncompleted. In this case, the vehicle runs with a friction lining in abutment with a brake target member rotating together with a wheel, whereby so-called brake dragging occurs, leading to a possibility of generation of uneven wear of the lining and a reduction in fuel efficiency.

SUMMARY OF INVENTION

The present invention has been conceived in consideration of the above-described issue with the conventional technique, and an object of the present invention is to provide a brake system capable of preventing occurrence of brake dragging.

To achieve the above-described and other objects, a brake system according to the present invention includes a brake apparatus capable of holding braking of a vehicle by an electric mechanism according to a braking request signal, and a control apparatus configured to control the electric mechanism and store at least a braking state that indicates holding or a release of the braking by the electric mechanism. The control apparatus actuates the electric mechanism so as to release the holding of the braking upon determining that the vehicle is in a running state.

DESCRIPTION OF EMBODIMENTS

Hereinafter, a brake system according to an embodiment of the present invention will be described in detail with reference to the accompanying drawings, based on an example in which this brake system is mounted on a four-wheeled automobile.

Figure 1:
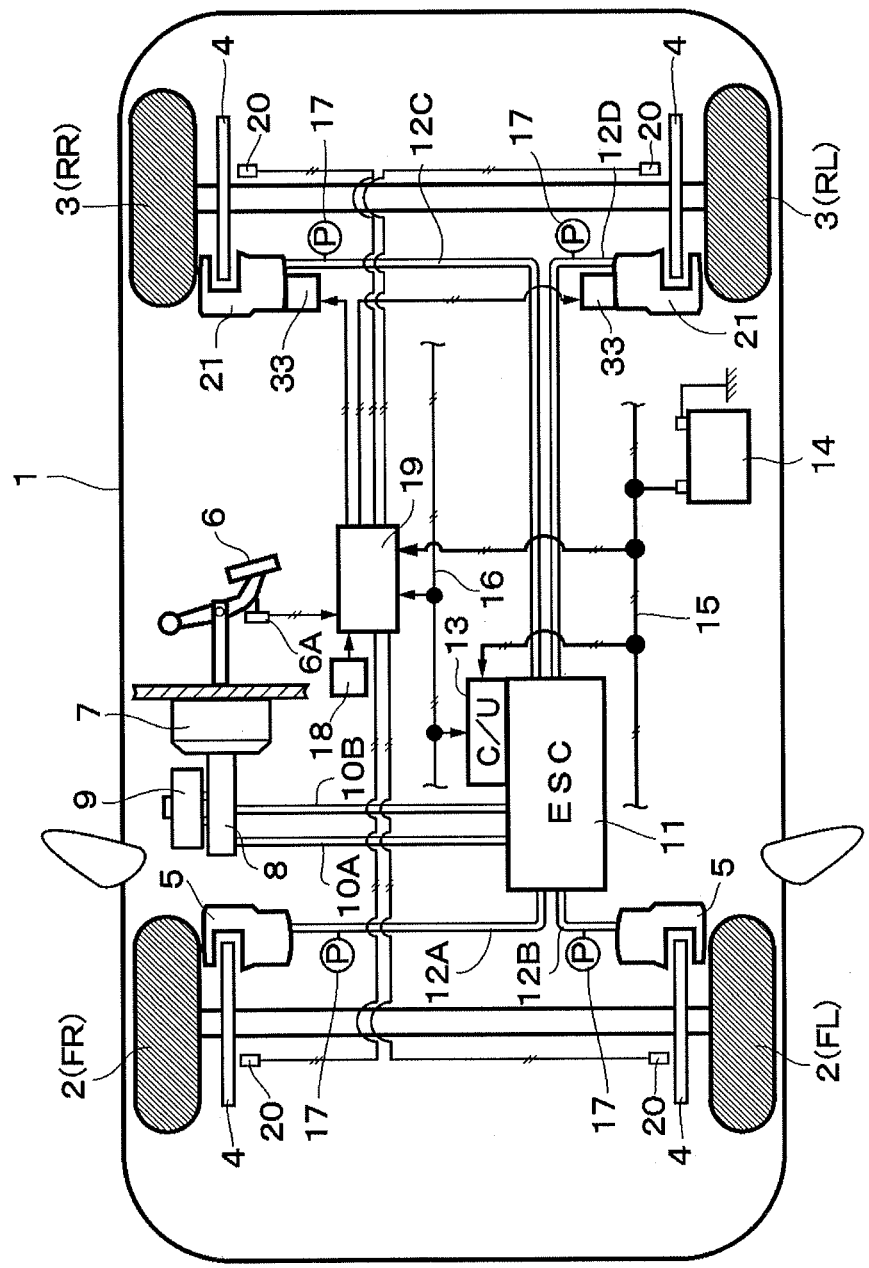
FIG. 1 is a conceptual diagram illustrating a vehicle on which a brake system according to an embodiment of the present invention is mounted.

Referring to FIG. 1, four wheels, for example, left and right front wheels 2 (FL and FR) and left and right rear wheels 3 (RL and RR) are provided on the bottom side (the road surface side) of a vehicle body 1, which constitutes a body of a vehicle. A disk rotor 4 is mounted at each of these front wheels 2 and rear wheels 3. The disk rotor 4 is a rotational member (a disk) that rotates together with each wheel (each of the front wheels 2 and the rear wheels 3). In other words, each disk rotor 4 is sandwiched by a hydraulic disk brake 5 at each of the front wheels 2, and each disk rotor 4 is sandwiched by a hydraulic disk brake 21 provided with an electric parking brake function, which will be described below, at each of the rear wheels 3. Due to this configuration, a brake force is applied to each of the wheels (each of the front wheels 2 and the rear wheels 3).

Figure 2:
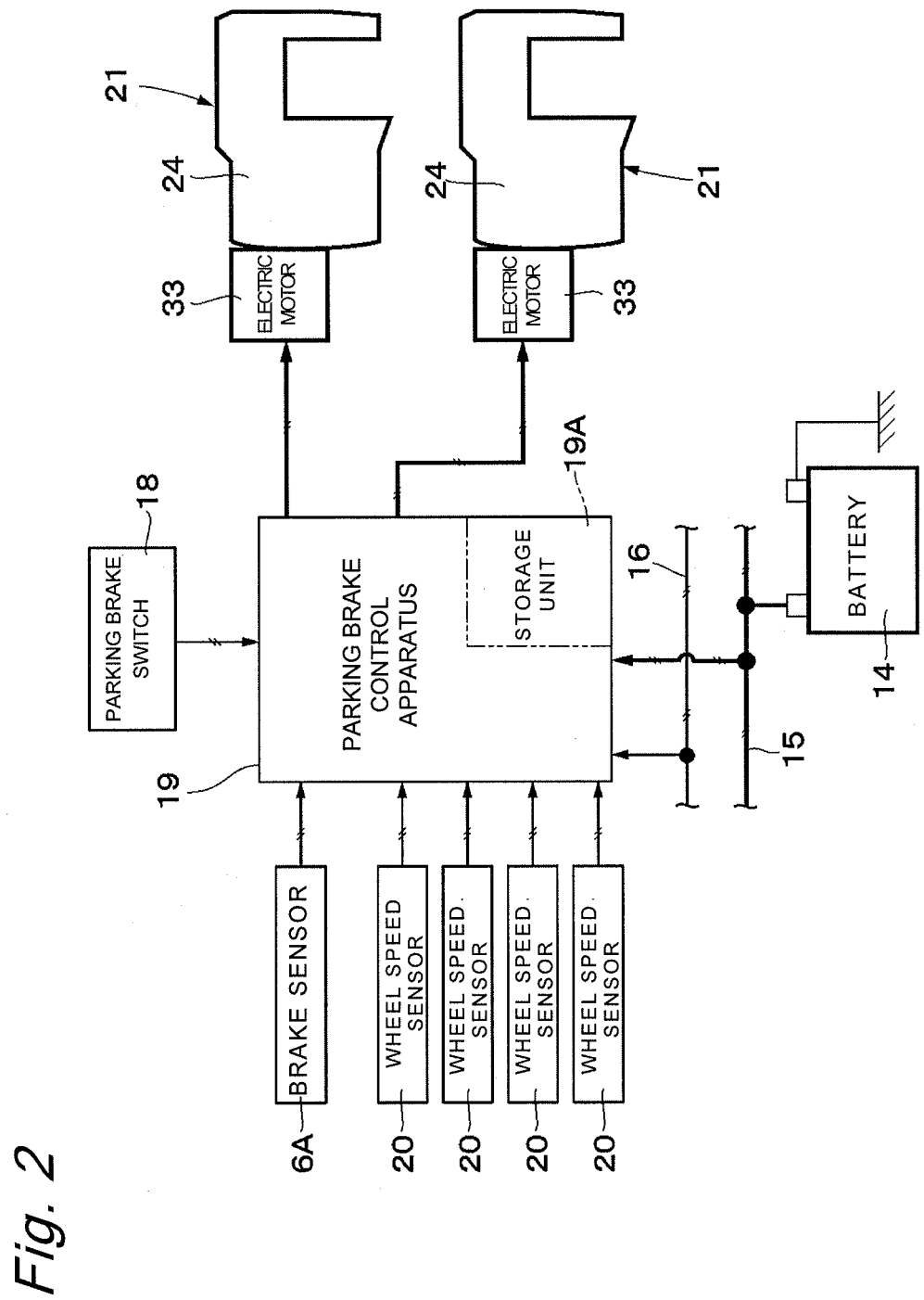
FIG. 2 is a block diagram illustrating a parking brake control apparatus illustrated in FIG. 1.

A brake pedal 6 is provided on a front board side of the vehicle body 1. The brake pedal 6 is pressed by a driver when the driver operates to brake the vehicle. A brake sensor 6A is provided at the brake pedal 6. This brake sensor 6A detects an amount of an operation performed on the brake pedal 6, and outputs a detection signal therefrom to a parking brake control apparatus 19, which will be described below. FIGS. 1 and 2 illustrate an example in which the vehicle is configured in such a manner that the brake sensor 6A is connected to the parking brake control apparatus 19, but, for example, the vehicle may be configured in such a manner that the brake sensor 6A is connected to a hydraulic pressure supply apparatus controller 13. In this case, the vehicle can be configured in such a manner that the detection signal from the brake sensor 6A is input to the parking brake control apparatus 19 via, for example, a not-illustrated communication line that connects the hydraulic pressure supply apparatus controller 13 and the parking brake control apparatus 19, or a vehicle data bus 16, which will be described below. Further, a brake lamp switch (not illustrated) is provided at the brake pedal 6. The brake lamp switch detects whether the brake pedal 6 is operated, and turns on or off, for example, a brake lamp (not illustrated).

A pressing operation performed on the brake pedal 6 is transmitted to a master cylinder 8 via a booster 7. The booster 7 is embodied by a negative pressure booster, an electric booster, or the like provided between the brake pedal 6 and the master cylinder 8. The booster 7 boosts a pressing force when a pressing operation is performed on the brake pedal 6, and transmits it to the master cylinder 8. At this time, the master cylinder 8 generates a hydraulic pressure with use of brake fluid supplied from a master reservoir 9. The master reservoir 9 corresponds to a hydraulic fluid tank that contains the brake fluid. The mechanism for generating a hydraulic pressure by the brake pedal 6 is not limited to the above-described mechanism, and may be any mechanism that can generate a hydraulic pressure according to an operation performed on the brake pedal 6, such as a brake-by-wire mechanism.

The hydraulic pressure generated in the master cylinder 8 is transmitted to a hydraulic pressure supply apparatus 11 (hereinafter referred to as an ESC 11) via, for example, a pair of cylinder-side hydraulic pipes 10A and 10B. This ESC 11 distributes and supplies the hydraulic pressure from the master cylinder 8 to the respective disk brakes 5 and 21 via brake-side piping portions 12A, 12B, 12C, and 12D. As a result, a brake force is applied to each of the wheels (each of the front wheels 2 and the rear wheels 3) as described above.

The ESC 11 includes the hydraulic pressure supply apparatus controller 13 (hereinafter referred to as a control unit 13), which controls an operation of the ESC 11. The control unit 13 drives and controls the ESC 11, thereby performing control so as to increase, reduce, or maintain a brake hydraulic pressure to be supplied from the brake-side piping portions 12A to 12D to the respective disk brakes 5 and 21. This adjustment of the brake hydraulic pressure can perform brake control such as boosting control, brake force distribution control, brake assist control, anti-skid control, traction control, vehicle stabilization control including skid prevention, and hill start aid control.

The control unit 13 comprises for example, a microcomputer. Power is supplied from a battery 14 to the control unit 13 via a power source line 15. Further, as illustrated in FIG. 1, the control unit 13 is connected to the vehicle data bus 16 and the like. The ESC 11 may be replaced with an ABS unit, which is a known technique. Further, the vehicle may be configured in such a manner that the ESC 11 is not provided (is omitted), and the master cylinder 8 is directly connected to the brake-side piping portions 12A to 12D.

A CAN as a serial communication unit is installed on the vehicle body 1 to allow execution of in-vehicle multiplex communication. The CAN includes the vehicle data bus 16. Multiplex communication is performed among, for example, a number of electronic devices mounted on the vehicle, the control unit 13, and the parking brake control apparatus 19, which will be described below, via the vehicle data bus 16. Examples of vehicle information transmitted to the vehicle data bus 16 include information such as detection signals from, for example, a steering angle sensor, an accelerator sensor, a brake sensor, a wheel speed sensor, a vehicle speed sensor, an inclination sensor, a stereo camera, a millimeter-wave radar, a seatbelt sensor, and transmission data (all of them are not illustrated). Further, the examples include a detection signal (information) from a pressure sensor 17 and the like.

The pressure sensor 17 is provided at each of the brake-side piping portions 12A to 12D. The pressure sensor 17 individually detects a pressure (a hydraulic pressure) in each of the piping portions, more specifically, a hydraulic pressure P in a caliper 24 (a cylinder portion 26) corresponding to the pressure in the piping portion. The caliper 24 will be described below. The vehicle may be configured to include one or two pressure sensors 17. For example, the vehicle may be configured in such a manner that the pressure sensors 17 is provided only at the cylinder-side hydraulic pipes 10A and 10B between the master cylinder 8 and the ESC 11.

A parking brake switch 18 is provided at the vehicle body 1 at a position near a driver's seat (not illustrated). The parking brake switch 18 is operated by the driver. When the parking brake switch 18 is operated toward a brake applying side (a parking brake ON side), power is supplied from the parking brake control apparatus 19 to each of the disk brakes 21 mounted at the rear wheels 3 to rotate an electric actuator 33 toward a brake applying side. The parking brake control apparatus 19 and the electric actuator 33 will be described below. As a result, each of the disk brakes 21 mounted at the rear wheels 3 starts to operate as the parking brake. On the other hand, to release the operation as the parking brake, the parking brake switch 18 is operated toward a brake releasing side (a parking brake OFF side). This operation causes power to be supplied to the disk brake 21 so as to rotate the electric actuator 33 in a reverse direction. As a result, each of the disk brakes 21 mounted at the rear wheels 3 stops to operate as the parking brake.

Even when the parking brake switch 18 is not operated toward the brake releasing side (the parking brake OFF side), the parking brake may be automatically applied according to a logic for determining whether to apply the parking brake, which is performed by the parking brake control apparatus 19.

The parking brake control apparatus 19 may automatically apply the parking brake, for example, when the vehicle speed is maintained at 0 km/h for a predetermined time period, when an engine stops working (an engine failure), or when a shift lever is operated to be located at a P (parking) position.

Further, the parking brake may be automatically released based on an operation performed on an accelerator or the like according to a logic for determining whether to release the parking brake, which is performed by the parking brake control apparatus 19.

Figure 4:
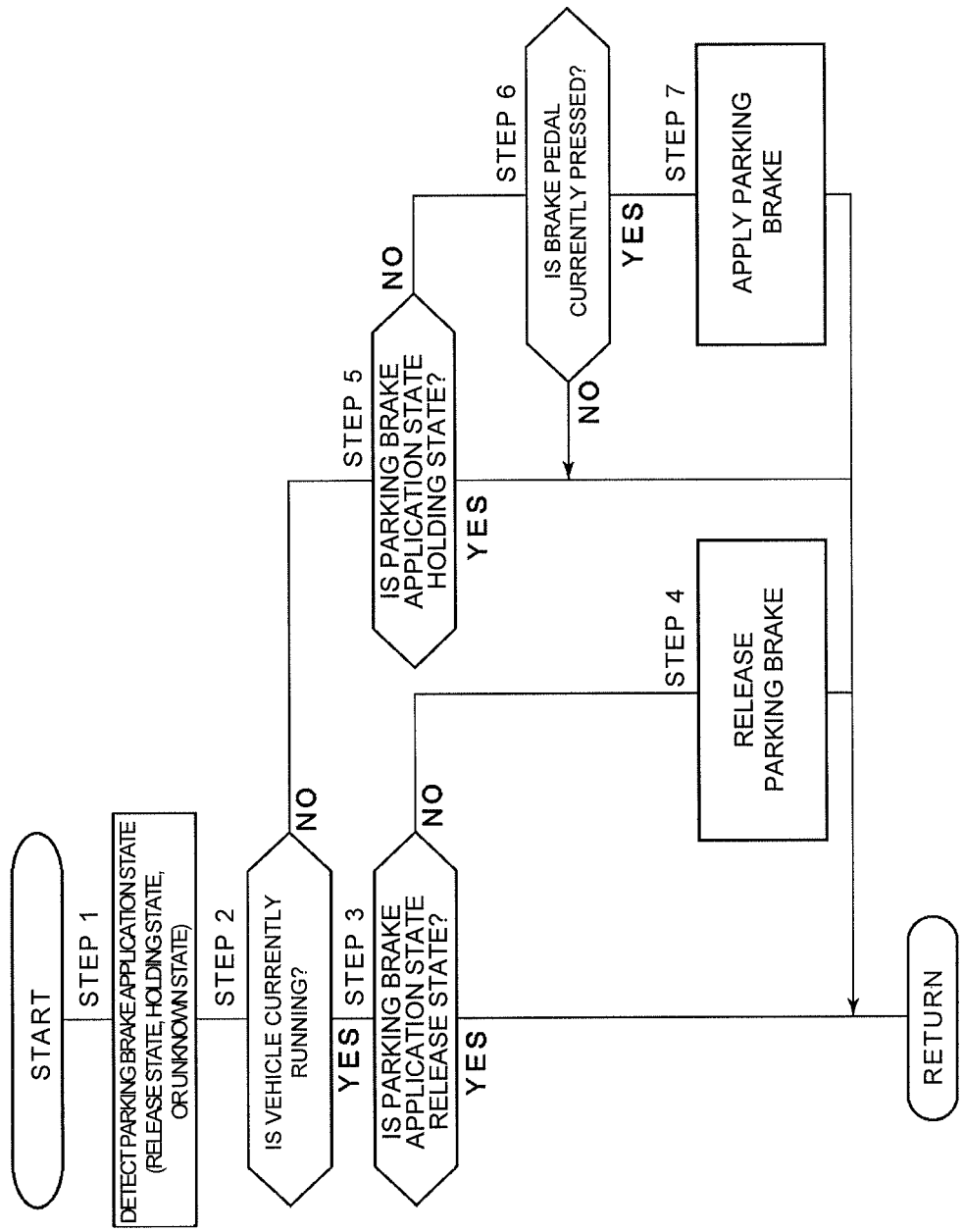
FIG. 4 is a flowchart illustrating control processing performed by the parking brake control apparatus illustrated in FIG. 1.

Further, according to the present embodiment, the parking brake is applied and released based on control processing illustrated in FIG. 4 automatically, i.e., independently of a driver's operation performed on the parking brake switch 18. The control processing illustrated in FIG. 4 will be described below.

A braking request signal (an application request signal), which is a signal for applying the parking brake, or a braking release request signal (an application release request signal), which is a signal for releasing the parking brake, include not only an application instruction signal or a release instruction signal output from the parking brake control apparatus 19 based on an operation performed on the parking brake switch 18, but also an application instruction signal or a release instruction signal output from the parking brake control apparatus 19 based on the above-described parking brake application/release determination logic, and an application instruction signal or a release instruction signal output from the parking brake control apparatus 19 based on the processing illustrated in FIG. 4.

The parking brake control apparatus 19 comprises a microcomputer and the like. Power is supplied from the battery 14 to the parking brake control apparatus 19 via the power source line 15. The parking brake control apparatus 19 corresponds to a control apparatus (a control means, a controller, and a control unit), which is a constitutional element of the present invention, and controls driving of the disk brake 21 (thus, the electric actuator 33) to generate a brake force when the vehicle is parked, stopped, and the like. The disk brake 21 will be described below.

The parking brake control apparatus 19 drives the electric actuator 33, which will be described below, to thereby apply or release the disk brake 21 as the parking brake based on a signal (an ON or OFF signal) output from the parking brake switch 18 when the parking brake switch 18 is operated by the driver of the vehicle.

Further, the parking brake control apparatus 19 drives the electric actuator 33 to thereby apply or release the disk brake 21 based on an instruction from the control processing illustrated in FIG. 4, i.e., parking brake application/release determination processing, in addition to the signal from the parking brake switch 18 and an instruction based on the above-described parking brake application/release determination logic. The control processing illustrated in FIG. 4 will be described below.

Figure 3:
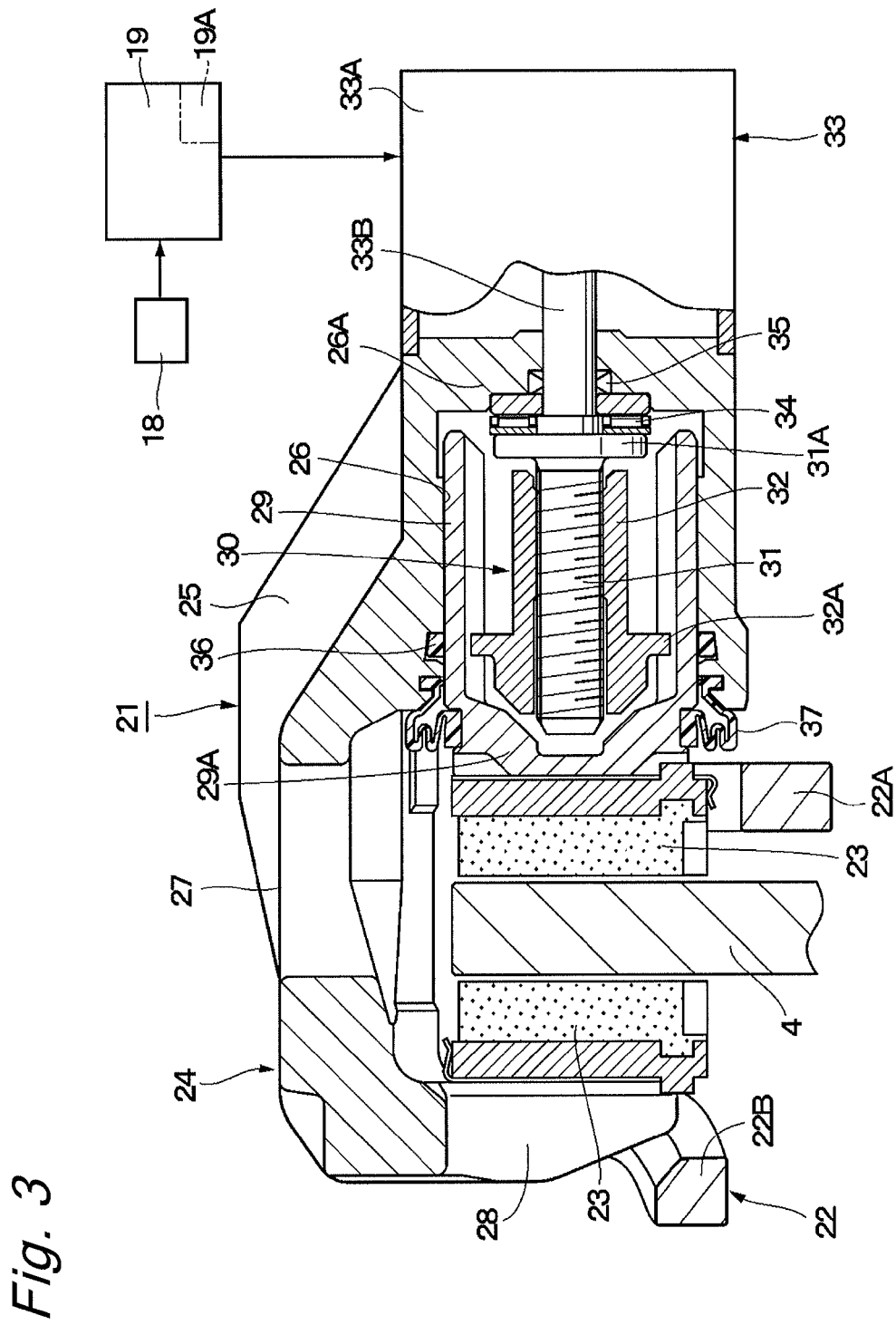
FIG. 3 is an enlarged vertical cross-sectional view illustrating a disk brake provided with an electric parking brake function, which is mounted at a rear wheel side illustrated in FIG. 1.

As illustrated in FIGS. 1 to 3, an input side of the parking brake control apparatus 19 is connected to the parking brake switch 18 and the like. An output side of the parking brake control apparatus 19 is connected to the electric actuator 33 of the disk brake 21 and the like. Further, the input side and the output side of the parking brake control apparatus 19 are connected to the control unit 13 of the ESC 11 and the like via the vehicle data bus 16. Various kinds of state amounts of the vehicle required to apply and release the parking brake, i.e., the above-described various kinds of vehicle information can be acquired from the vehicle data bus 16. The vehicle information does not necessarily have to be acquired from the vehicle data bus 16. The vehicle may be configured in such a manner that the vehicle information is acquired by directly connecting the sensors that detect the vehicle information to the parking brake control apparatus 19.

For example, the illustrated example is configured in such a manner that the wheel speed sensor 20 is directly connected to the parking brake control apparatus 19. More specifically, the wheel speed sensor 20 is connected to the input side of the parking brake control apparatus 19. The vehicle is configured in such a manner that the wheel speed sensor 20 is provided at each of the wheels (each of the front wheels 2 and the rear wheels) so as to be able to detect rotational speeds of all of the four wheels (the respective front wheels 2 and rear wheels 3).

However, the wheel speed sensor 20 does not necessarily have to be provided at all of the four wheels (the respective front wheels 2 and rear wheels 3), as long as the parking brake control apparatus 19 can determine whether the vehicle is running. For example, the vehicle may be configured in such a manner that the wheel speed sensor 20 is provided at only one of the left and right front wheels 2 where the disk brakes 5 lacking the electric parking brake function are mounted. Alternatively, the vehicle may be configured in such a manner that the wheel speed sensor 20 is provided to at least one of the four wheels (respective front wheels 2 and rear wheels 3).

The parking brake control apparatus 19 includes a storage unit (memory) 19A (refer to FIGS. 2 and 3) embodied by, for example, a flash memory, a ROM, a RAM, or an EEPROM. This storage unit 19A stores a program for the processing illustrated in FIG. 4, which will be described below, i.e., a processing program for determining whether to apply or release the parking brake, and applying or releasing the disk brake 21 according to this determination.

Further, the storage unit 19A of the parking brake control apparatus 19 stores at least a braking state, which indicates whether the electric actuator 33 holds or releases braking, i.e., a braking status. More specifically, every time a state (a holding state or a release state, or an unknown state if necessary) of a piston 29 by a piston holding mechanism (a rotation/linear motion conversion mechanism 30) is changed, the changed braking state of the electric actuator 33 is stored into the storage unit 19A. The piston holding mechanism will be described below.

More specifically, the parking brake control apparatus 19 raises a holding flag when the rotation/linear motion conversion mechanism 30 has completed holding of the piston 29, and raises a release flag when the rotation/linear motion conversion mechanism 30 has completed a release of the piston 29.

The state of the piston 29 by the rotation/linear motion conversion mechanism 30 is stored into the storage unit 19A as the "holding state" when the holding flag is raised, and as the "release state" when the release flag is raised.

Further, while the electric actuator 33 is operating to hold or release braking, this operation may be terminated due to, for example, a reduction in a voltage, a stop of the system, abnormal shutdown of the system, and a stop of power supply. In this case, the parking brake control apparatus 19 cannot determine whether the braking state by the electric actuator 33 is the "holding state" or the "release state". Further, during a period from a start of driving of the electric actuator 33 to a raise of the holding flag or the release flag, the driving of the electric actuator 33 may be terminated. In this case, the parking brake control apparatus 19 also cannot determine whether the braking state by the electric actuator 33 is the "holding state" or the "release state". When it is impossible to determine whether the braking state by the electric actuator 33 is the "holding state" or the "release state" in this manner, the braking state by the electric actuator 33 is determined as the "unknown state". In this case, the braking state by the electric actuator 33 is stored into the storage unit 19A as the "unknown state". The "unknown state" means a state in which it is unknown whether braking is "held" or "released", and may be data called an "operation incompletion state".

The storage unit 19A is embodied by a non-volatile storage device (a memory) that can maintain stored data even without receiving power supply, such as an EEPROM. Therefore, the state of the rotation/linear motion conversion mechanism 30 (the state of the piston 29) stored in the storage unit 19A can be immediately used even when the system is restarted after a stop of power supply to the parking brake control apparatus 19 (after a stop of the system or abnormal shutdown of the system).

According to the present embodiment, the parking brake control apparatus 19 is prepared as a separate component from the control unit 13 in the ESC 11, but may be configured integrally with the control unit 13. Further, the parking brake control apparatus 19 controls both the two left and right disk brakes 21, but may be provided for each of the left and right disk brakes 21. In this case, the parking brake control apparatus 19 may be provided integrally with the disk brake 21.

According to the present embodiment, the parking brake control apparatus 19 is configured to actuate the electric actuator 33 so as to release holding of braking, upon determining that the vehicle is in a running state.

Determining that the vehicle in a running state does not mean determining that the vehicle shifts from a stopped state to a running state but simply means determining that the vehicle is running currently. More specifically, the parking brake control apparatus 19 is configured to actuate the piston holding mechanism (the rotation/linear motion conversion mechanism 30) by the electric actuator 33 so as to release holding of the piston 29 when the vehicle speed is maintained at a speed higher than 0 km/h (for example, the vehicle speed is maintained at 2 to 10 km/h or higher, more preferably, 5 to 7 km/h or higher) for a predetermined time period (for example, 2 to 10 seconds or longer, more preferably, 5 to 7 seconds or longer). In this case, for example, the vehicle speed can be calculated from a detection signal from the wheel speed sensor 20. Alternatively, the parking brake control apparatus 19 may use a detection signal from a vehicle speed sensor provided at a not-illustrated reducer (transmission) to acquire the vehicle speed.

Because the vehicle speed may increase sometimes although the driver does not intend to do so, the driver's intention, i.e., an operation on the accelerator may be added to the conditions when the vehicle is running at a low speed of approximately 1 to 5 km/h.

On the other hand, if the braking state by the electric actuator 33 is not stored as the holding state (the braking state by the electric actuator 33 is the release state or the unknown state) at the time of startup of the system, i.e., at the time of a start of power supply to the parking brake control apparatus 19 to start up the system, the parking brake control apparatus 19 actuates the electric actuator 33 so as to hold braking if the brake pedal 6 is operated (pressed) and the vehicle is stopped (the vehicle is not in a running state).

More specifically, if the braking state by the electric actuator 33 is stored in the storage unit 19A as the "release state" or the "unknown state" when the system is started up, the parking brake control apparatus 19 drives the electric actuator 33 toward the brake applying side to apply the parking brake, provided that the brake pedal 6 is pressed and the vehicle speed is 0 km/h.

In this case, the parking brake control apparatus 19 may determine whether the brake pedal 6 is operated based on, for example, a signal from the brake sensor 6A, or may make this determination using a signal from the not-illustrated brake lamp switch. This processing for applying and releasing the parking brake will be described in detail below.

Next, a configuration of the disk brake 21 provided with the electric parking brake function, which is mounted at each of the left and right rear wheels 3, will be described with reference to FIG. 3. FIG. 3 illustrates only one of the left and right disk brakes 21 respectively mounted corresponding to the left and right rear wheels 3.

The pair of disk brakes 21 respectively mounted at the left and right sides of the vehicle are configured as hydraulic disk brakes each provided with the electric parking brake function. More specifically, each of the disk brakes 21 is configured as a brake apparatus capable of braking the vehicle by the electric actuator 33 according to a braking request signal (for example, an ON signal from the parking brake switch 18, an application instruction based on the above-described parking brake application/release determination logic, and an application instruction based on the processing illustrated in FIG. 4).

The disk brake 21 includes a mounting member 22 attached to a non-rotatable portion near the rear wheel 3 of the vehicle, inner-side and outer-side brake pads 23 as friction members, and a caliper 24 containing the electric actuator 33, which will be described below.

The mounting member 22 includes a pair of arm portions (not illustrated) and a thick support portion 22A. The arm portions extend over an outer circumference of the disk rotor 4 in a direction along an axis of the disk rotor 4 (i.e., a disk axial direction), and are spaced apart from each other in a disk circumferential direction. The support portion 22A is provided to integrally connect proximal end sides of the respective arm portions, and is fixed to the non-rotatable portion of the vehicle at a position on an inner side of the disk rotor 4.

Further, a reinforcement beam 22B is integrally formed at the mounting member 22. The reinforcement beam 22B couples distal end sides of the respective arm portions to each other at a position on an outer side of the disk rotor 4.

In this manner, the respective arm portions of the mounting member 22 are integrally coupled to each other by the support portion 22A on the inner side of the disk rotor 4, and are integrally coupled to each other by the reinforcement beam 22B on the outer side of the disk rotor 4.

The inner-side and outer-side brake pads 23 correspond to friction members. The inner-side and outer-side brake pads 23 are disposed so as to be able to abut against both surfaces of the disk rotor 4 rotating together with the wheel (more specifically, the rear wheel 3) of the vehicle, and are supported so as to be movable by the respective arm portions of the mounting member 22 in the disk axial direction. The inner-side and outer-side brake pads 23 are pressed against the both surfaces of the disk rotor 4 by the caliper 24 (a caliper main body 25 and the piston 29), which will be described below.

The caliper 24 is disposed at the mounting member 22 so as to extend over the outer circumferential side of the disk rotor 4. The caliper 24 generally comprises the caliper main body 25 supported so as to be movable relative to the respective arm portions of the mounting member 22 in the direction along the axis of the disk rotor 4, and the piston 29 disposed in the caliper main body 25.

The caliper 24 contains the rotation/linear motion conversion mechanism 30, which will be described below, and the electric actuator 33. The caliper 24 presses (advances) the brake pads 23 through the piston 29 by a hydraulic pressure based on an operation performed on the brake pedal 6.

The caliper main body 25 includes the cylinder portion 26, a bridge portion 27, and a claw portion 28. One axial side of the cylinder portion 26 forms a partition wall portion 26A, whereby this side of the cylinder portion 26 is closed. Further, an opposite side of the cylinder portion 26 that faces the disk rotor 4 forms an opening end. In this manner, the cylinder portion 26 is formed into a bottomed cylindrical shape. The bridge portion 27 is formed to extend from the cylinder portion 26 in the disk axial direction over the outer circumferential side of the disk rotor 4. The claw portion 28 is disposed so as to extend toward the opposite side of the bridge portion 27 from the cylinder portion 26. The cylinder portion 26 of the caliper main body 25 constitutes an inner leg portion located at one side (the inner side) of the disk rotor 4. The claw portion 28 constitutes an outer leg portion located at an opposite side (the outer side) of the disk rotor 4.

A hydraulic pressure is supplied to the cylinder portion 26 of the caliper main body 25 according to, for example, a pressing operation performed on the brake pedal 6 via the brake-side piping portion 12C or 12D illustrated in FIG. 1. The partition wall portion 26A is integrally formed with this cylinder portion 26 between the cylinder portion 26 and the electric actuator 33, which will be described below. An output shaft 33B of the electric actuator 33 is rotatably inserted in an inner circumferential side of the partition wall portion 26A.

The cylinder portion 26 of the caliper main body 25 contains the piston 29 and the rotation/linear motion conversion mechanism 30, which will be described below. According to the present embodiment, the vehicle is configured in such a manner that the rotation/linear motion conversion mechanism 30 is contained in the piston 29, but the rotation/linear motion conversion mechanism 30 does not necessarily have to be contained in the piston 29 as long as the piston 29 can be advanced by the rotation/linear motion conversion mechanism 30.

The piston 29 has one side in the axial direction that corresponds to an opening end, and an opposite side in the axial direction that faces the inner-side brake pad 23. The one side of the piston 29 is inserted in the cylinder portion 26. The opposite side of the piston 29 is constituted by a cover portion 29A. In this manner, the opposite side of the piston 29 is closed by the cover portion 29A.

Further, the rotation/linear motion conversion mechanism 30 is disposed in the cylinder portion 26 so as to be contained within the piston 29. The piston 29 is configured to be advanced by the rotation/linear motion conversion mechanism 30 in the direction along the axis of the cylinder portion 26. The rotation/linear motion conversion mechanism 30 corresponds to the piston holding mechanism, which is a constituent element of the present invention. The piston 29 of the caliper 24 is advanced by an external force, i.e., the electric actuator 33 besides the above-described supply of the hydraulic pressure into the cylinder portion 26, and is held in the advanced state. Then, because the left and right disk brakes 21 are provided so as to correspond to the left and right rear wheels 3, respectively, the rotation/linear motion conversion mechanisms 30 and the electric actuators 33 are also provided at the respective left and right sides of the vehicle.

The rotation/linear motion conversion mechanism 30 includes a screw member 31 having a rod-like body with a male screw such as a trapezoidal screw thread formed thereon, and a linearly movable member 32 with a female screw hole of a trapezoidal screw thread formed on an inner circumferential side thereof. In other words, the screw member 31 threadably engaged with the inner circumferential side of the linearly movable member 32 constitutes a screw mechanism that converts a rotational movement by the electric actuator 33, which will be described below, into to a linear movement of the linearly movable member 32. In this case, the female screw of the linearly movable member 32 and the male screw of the screw member 31 are formed using highly irreversible screws, trapezoidal screw threads in the present embodiment, thereby realizing the piston holding mechanism. This piston holding mechanism (the rotation/linear motion conversion mechanism 30) holds the linearly movable member 32 (thus, the piston 29) at an arbitrary position with the aid of a friction force (a holding force) even when power supply to the electric actuator 33 is stopped, thereby achieving energy saving.

The piston holding mechanism may be realized by any mechanism that can hold the piston 29 at a position to which the piston 29 is advanced by the electric actuator 33, and may be realized by, for example, a highly irreversible screw that is not a trapezoidal screw thread.

The screw member 31 disposed so as to be threadably engaged with the inner circumferential side of the linearly movable member 32 includes a flange portion 31A, which is a flange having a large diameter, at one side in the axial direction.

An opposite end of the screw member 31 in the axial direction extends toward the cover portion 29A of the piston 29. The screw member 31 is integrally coupled with the output shaft 33B of the electric actuator 33, which will be described below, at an end of the screw member 31 where the flange portion 31A is formed. Further, an engagement protrusion 32A is formed on an outer circumferential side of the linearly movable member 32. The engagement protrusion 32A prevents the linearly movable member 32 from rotating relative to the piston 29 (prevents a relative rotation) while allowing the linearly movable member 32 to relatively move in the axial direction.

The electric actuator 33 as an electric mechanism (an electric motor or a parking brake actuator) is disposed within a casing 33A. This casing 33A is fixed to the cylinder portion 26 of the caliper main body 25 at the outside position of the partition wall portion 26A. The electric actuator 33 includes a known motor including a stator, a rotor, and the like, and a reducer for amplifying a torque of the motor (both of them are not illustrated). The reducer includes the output shaft 33B that outputs the amplified rotational torque. The output shaft 33B extends through the partition wall portion 26A of the cylinder portion 26 in the direction along the axis of the cylinder portion 26, and is integrally rotatably coupled with the flange portion 31A of the screw member 31 within the cylinder portion 26.

A means for coupling the output shaft 33B and the screw member 31 may be configured, for example, so as to allow them to move in the axial direction but prevent them from rotating in the rotational direction. In this case, the output shaft 33B and the screw member 31 are coupled with each other using a known technique such as spline fitting or fitting using a polygonal rod (non-circular fitting). The reducer may be embodied by, for example, a planetary gear reducer or a worm gear reducer. Further, if the reducer is embodied by a known reducer unable to operate reversely (an irreversible reducer) such as a worm gear reducer, the rotation/linear motion conversion mechanism 30 can be embodied by a known reversible mechanism such as a ball screw or a ball ramp mechanism. In this case, the piston holding mechanism can be realized by, for example, the reversible rotation/linear motion conversion mechanism and the irreversible reducer.

When the driver operates the parking brake switch 18 illustrated in FIGS. 1 to 3, power is supplied from the parking brake control apparatus 19 to the electric actuator 33 (the motor thereof), thereby rotating the output shaft 33B of the electric actuator 33. Therefore, the screw member 31 of the rotation/linear motion conversion mechanism 30 rotates integrally together with the output shaft 33B, for example, in one direction, and advances (drives) the piston 29 toward the disk rotor 4 via the linearly movable member 32. As a result, the disk brake 21 sandwiches the disk rotor 4 between the inner-side and outer-side brake pads 23, thereby applying braking as the electric parking brake.

On the other hand, when the driver operates the parking brake switch 18 to the brake releasing side, the screw member 31 of the rotation/linear motion conversion mechanism 30 is rotationally driven in the other direction (the reverse direction) by the electric actuator 33. As a result, the linearly movable member 32 is driven in the backward direction so as to move away (further separate away) from the disk rotor 4 via the rotation/linear motion conversion mechanism 30, whereby the disk brake 21 releases braking as the parking brake.

In this case, in the rotation/linear motion conversion mechanism 30, a relative rotation of the screw member 31 relative to the linearly movable member 32 causes the linearly movable member 32 to relatively axially move according to the rotational angle of the screw member because the linearly movable member 32 is prevented from rotating within the piston 29. In this manner, the rotation/linear motion conversion mechanism 30 converts a rotational movement into a linear movement, thereby moving the piston 29 forward or backward by the linearly movable member 32. Further, the rotation/linear motion conversion mechanism 30 holds the linearly movable member 32 at an arbitrary position with the aid of a friction force, thereby holding the piston 29 at a position to which the piston 29 is advanced by the electric actuator 33.

A thrust bearing 34 is provided between the partition wall portion 26A of the cylinder portion 26 and the flange portion 31 of the screw member 31. This thrust bearing 34 receives a thrust load from the screw member 31 together with the partition wall portion 26A, thereby facilitating the rotation of the screw member 31 relative to the partition wall portion 26A Further, a seal member 35 is provided between the partition wall portion 26A of the cylinder portion 26 and the output shaft 33B of the electric actuator 33. This seal member 35 provides a seal between the partition wall portion 26A and the output shaft 33 so as to prevent the brake fluid in the cylinder portion 26 from leaking toward the electric actuator 33.

Further, a piston seal 36 and a dust boot 37 are provided at the opening end side of the cylinder portion 26. The piston seal 36 functions as an elastic seal for providing a seal between the cylinder portion 26 and the piston 29. The dust boot 37 prevents foreign objects from entering the cylinder portion 26. The dust boot 37 is embodied by a flexible bellows-like seal member, and is attached between the opening end of the cylinder portion 26 and the outer circumference of the cover portion 29A of the piston 29.

The disk brakes 5 mounted at the front wheels 2 are configured in a substantially similar manner to the disk brakes 21 mounted at the rear wheels 3 except for the parking brake mechanism. More specifically, the disk brakes 5 mounted at the front wheels 2 do not include the rotation/linear motion conversion mechanism 30, the electric actuator 33, and the like that function as the parking brake, unlike the disk brakes 21 mounted at the rear wheels 3. However, except for that, the disk brakes 5 mounted at the front wheels 2 are configured in a substantially similar manner to the disk brakes 21. Further, in some case, the disk brakes 21 each provided with the parking brake function may be also mounted at the front wheels 2, instead of the disk brakes 5.

The present embodiment has been described based on an example of the hydraulic disk brake 21 including the caliper 24 containing the electric actuator 33. However, the present invention is not limited thereto. The disk brake may be any brake apparatus capable of advancing a friction member such as a brake pad and shoe by an electric motor (the electric actuator) as the electric mechanism, such as an electric disk brake including an electric caliper, an electric drum brake including an electric drum for applying a brake force by an electric actuator, and a disk brake provided with an electric drum type parking brake. The configuration thereof is not limited to the configuration according to the above-described embodiment.

The brake system of the four-wheeled automobile according to the present embodiment is configured in the above-described manner. Next, an operation thereof will be described.

When the driver of the vehicle operates the brake pedal 6 by pressing it, this pressing force is transmitted to the master cylinder 8 via the booster 7, thereby generating a brake hydraulic pressure by the master cylinder 8. The hydraulic pressure generated in the master cylinder 8 is distributed and supplied to the respective disk brakes 5 and 21 via the cylinder-side hydraulic pipes 10A and 10B, the ESC 11, and the brake-side piping portions 12A, 12B, 12C, and 12D, thereby applying a brake force to each of the left and right front wheels 2 and the left and right rear wheels 3.

The operation in this case will be described based on one of the disk brakes 21 mounted at the rear wheels 3. The hydraulic pressure is supplied into the cylinder portion 26 of the caliper 24 via the brake-side piping portion 12C or 12D. According to an increase in the hydraulic pressure in the cylinder portion 26, the piston 29 is slidably displaced toward the inner-side brake pad 23. Due to this displacement, the piston 29 presses the inner-side brake pad 23 against one-side surface of the disk rotor 4, and a reaction force at this time causes the whole caliper 24 to be slidably displaced toward the inner side of the disk rotor 4 relative to the respective arm portions of the mounting member 22.

As a result, the outer leg portion (the claw portion 28) of the caliper 24 operates so as to press the outer-side brake pad 23 against the disk rotor 4. The disk rotor 4 is sandwiched by the pair of brake pads 23 from both the axial sides, by which a brake force is generated according to the supply of the hydraulic pressure. On the other hand, when the driver release the brake operation, the supply of the hydraulic pressure into the cylinder portion 26 is released or stopped, whereby the piston 29 is displaced so as to be retracted into the cylinder portion 26, and the inner-side and outer-side brake pads 23 are separated away from the disk rotor 4, thereby returning the vehicle to an unbraked state.

Next, when the driver of the vehicle operates the parking brake switch 18 to apply the parking brake, power is supplied from the parking brake control apparatus 19 to the electric actuator 33 of the disk brake 21, and the output shaft 33B of the electric actuator 33 is rotationally driven. The disk brake 21 provided with the electric parking brake converts the rotation of the electric actuator 33 into a linear movement via the screw member 31 and the linearly movable member 32 of the rotation/linear motion conversion mechanism 30 to axially move the linearly movable member 32, thereby advancing the piston 29. As a result, the pair of brake pads 23 is pressed against the both surfaces of the disk rotor 4.

At this time, the linearly movable member 32 is held in the brake applying state by a friction force (a holding force) generated between the linearly movable member 32 and the screw member 31, whereby the disk brake 21 mounted at the rear wheel 3 applies braking as the parking brake. This means that the linearly movable member 32 (thus, the piston 29) can be held at the brake applying position by the female screw of the linearly movable member 32 and the male screw of the screw member 31, even after a stop of the power supply to the electric actuator 33.

On the other hand, when the driver operates the parking brake switch 18 to the brake releasing side to release the parking brake, power is supplied from the parking brake control apparatus 19 to the electric actuator 33 so as to rotate the motor in the reverse direction, whereby the output shaft 33B of the electric actuator 33 rotates in the reverse direction of the direction at the time of application of the parking brake. At this time, the rotation/linear motion conversion mechanism 30 releases the holding of the brake force by the screw member 31 and the linearly movable member 32. Further, the linearly movable member 32 moves into the cylinder portion 26 in a return direction by a movement amount corresponding to the reverse rotation of the electric actuator 33, thereby releasing the brake force of the parking brake (the disk brake 21).

On the other hand, the vehicle may run with a release or application of the parking brake uncompleted, for example, when the system stops due to a reduction in the voltage of the power source or the like while the parking brake is in the middle of being released or being applied, and the system recovers after that. In this case, brake dragging occurs, leading to a possibility of generation of uneven wear of the lining and a reduction in fuel efficiency. Further, similarly, if the vehicle runs with the parking brake remaining applied, brake dragging also occurs, leading to a possibility of generation of uneven wear of the lining and a reduction in fuel efficiency.

Therefore, according to the present embodiment, the parking brake control apparatus 19 is configured to determine whether to apply or release the parking brake according to whether the vehicle is in a running state and whether the brake pedal 6 is currently operated.

In the following description, this control processing will be described with reference to FIG. 4. In the following description, the term "apply" will be used to refer to an operation for actuating the parking brake, i.e., driving the electric actuator 33 to advance the piston 29 by the rotation/linear motion conversion mechanism 30, and holding the advanced piston 29. The term "release" will be used to refer to an operation for releasing this holding. Further, the processing illustrated in FIG. 4 is repeatedly performed every time a predetermined time has elapsed while power is supplied to the parking brake control apparatus 19.

After a start of the processing operation illustrated in FIG. 4, in step 1, the parking brake control apparatus 19 detects a parking brake application state (a braking state) of the disk brake 21. The parking brake control apparatus 19 detects this state by reading out the state of the disk brake 21 stored in the storage unit 19A, i.e., which state the braking state is among the above-described "holding state", "release state", or "unknown state" stored according to the above-described holding flag and the release flag from the storage unit 19A of the parking brake control apparatus 19.

In the next step, step S2, the parking brake control apparatus 19 determines whether the vehicle is in a running state (whether the vehicle is currently running). The parking brake control apparatus 19 can make this determination based on, for example, a speed of the vehicle acquired from a detection signal from the wheel speed sensor 20. At this time, the parking brake control apparatus 19 determines that the vehicle is in a running state (the vehicle is currently running), for example, if the speed of the vehicle is maintained at a speed higher than 0 km/h (for example, the speed of the vehicle is maintained at a speed of 2 to 10 km/h or higher, more preferably, the speed of the vehicle is maintained at a speed of 5 to 7 km/h or higher) for a predetermined time period (for example, 2 to 10 seconds or longer, more preferably, 5 to 7 seconds or longer). The parking brake control apparatus 19 may detect the speed of the vehicle with use of a detection signal from the vehicle speed sensor mounted at the reducer (the transmission). When the vehicle is running at a low speed of approximately 1 to 5 km/h, the driver's intention to run, i.e., an operation on the accelerator or the like may be added to the conditions.

If the parking brake control apparatus 19 determines "YES" in step 2, i.e., determines that the vehicle is in a running state (the vehicle is currently running), the processing proceeds to step 3. In step 3, the parking brake control apparatus 19 determines whether the parking brake application state of the disk brake 21 detected (read out) in step 1 is the "release state". If the parking brake control apparatus 19 determines "YES" in step S3, i.e., determines that the parking brake is in the release state, the processing goes back to the start via a return step. Then, the parking brake control apparatus 19 repeats step 1 and the steps thereafter.

On the other hand, if the parking brake control apparatus 19 determines "NO" in step 3, i.e., determines that the parking brake is not in the release state (the parking brake is in the holding state or the unknown state), the processing proceeds to step 4. Then, the parking brake control apparatus 19 releases the parking brake of the disk brake 21. More specifically, the parking brake control apparatus 19 drives the electric actuator 33 of the disk brake 21 to the brake releasing side, thereby releasing the parking brake. Then, the processing goes back to the start via the return step. After that, the parking brake control apparatus 19 repeats step 1 and the steps thereafter. In this manner, the parking brake control apparatus 19 releases the parking brake in the process of step 4, thereby preventing occurrence of brake dragging while the vehicle is running.

If the parking brake control apparatus 19 determines "NO" in step 2, i.e., determines that the vehicle is not in a running state (the vehicle is not currently running) (the vehicle is stopped), the processing proceeds to step 5. In step 5, the parking brake control apparatus 19 determines whether the parking brake application state of the disk brake 21 detected (read out) in step 1 is the "holding" state. If the parking brake control apparatus 19 determines "YES" in step 5, i.e., determines that the parking brake is in the "holding state", the processing goes back to the start via the return step. Then, the parking brake control apparatus 19 repeats step 1 and the steps thereafter.

On the other hand, if the parking brake control apparatus 19 determines "NO" in step 5, i.e., determines that the parking brake is not in the holding state (the parking brake is in either the release state or the unknown state), the processing proceeds to step 6. Then, the parking brake control apparatus 19 determines whether the brake pedal 6 is currently operated. The parking brake control apparatus 19 can make this determination based on, for example, a signal from the brake sensor 6A, and can also make this determination based on a signal from the not-illustrated brake lamp switch.

If the parking brake control apparatus 19 determines "YES" in step S6, i.e., determines that the brake pedal 6 is currently operated (the brake pedal is currently pressed), the processing proceeds to step 7. Then, the parking brake control apparatus 19 applies the parking brake of the disk brake 21. More specifically, the parking brake control apparatus 19 drives the electric actuator 33 of the disk brake 21 to the brake applying side, thereby applying the parking brake. Then, the processing goes back to the start via the return step. After that, the parking brake control apparatus 19 repeats step 1 and the steps thereafter. In this manner, the parking brake control apparatus 19 applies the parking brake in the process of step 7, thereby allowing the parking brake to be automatically applied so as to meet the driver's intention to maintain the vehicle in a stopped (parked) state. In this case, the driver may fail to release the parking brake when starting to move the vehicle, because the driver himself/herself does not apply the parking brake by operating the parking brake switch 18. However, even when the driver starts to move the vehicle, the control should be in a normal state because the normal brake application is completed so that the parking brake can be released by other release control when the vehicle starts to run, for example, a release of the parking brake triggered by an operation performed on the accelerator with the driver wearing a seatbelt, thereby preventing occurrence of brake dragging.

On the other hand, if the parking brake control apparatus 19 determines "NO" in step 6, i.e., determines that the brake pedal is not currently operated (the brake pedal is not currently pressed), the processing goes back to the start via the return step. Then, the parking brake control apparatus 19 repeats step 1 and the steps thereafter. If the parking brake control apparatus 19 determines "NO" in step 6, this means that the vehicle is parked. Therefore, the parking brake control apparatus 19 may apply the parking brake in a similar manner to the process when the parking brake control apparatus 19 determines "YES" in step 6. More specifically, if the parking brake control apparatus 19 determines "NO" in step 5, i.e., determines that the parking brake is not in the holding state (either in the release state or the unknown state), the processing may proceed to step 7 and, the parking brake control apparatus 19 may apply the parking brake regardless of whether the brake pedal 6 is operated. In this case, the driver may start to move the vehicle without releasing the parking brake. However, even if the driver starts to move the vehicle without releasing the parking brake, the parking brake can be released by, for example, the above-described other release control when the vehicle starts to run, thereby preventing occurrence of brake dragging.

According to the present embodiment, it is possible to prevent occurrence of brake dragging of the disk brake 21 provided with the electric parking brake function.

More specifically, according to the present embodiment, when the vehicle is maintained in a running state, the parking brake control apparatus 19 drives the electric actuator 33 so as to release holding of braking, thereby releasing the parking brake. Therefore, the parking brake is automatically released when the vehicle is running with the parking brake maintained in a brake applying state (the holding state). Further, even if the vehicle runs with a release or application of the parking brake uncompleted, the parking brake can be automatically released. Therefore, it is possible to prevent occurrence of brake dragging of the disk brake 21, thereby preventing generation of uneven wear of the lining and a reduction in fuel efficiency.

Further, according to the present embodiment, the parking brake control apparatus 19 applies the parking brake if the brake pedal 6 is operated at that moment, when the braking state of the parking brake is not stored as the holding state upon startup of the system. Therefore, it is possible to automatically apply the parking brake so as to meet the driver's intention to maintain the vehicle in a stopped (parked) state. In this case, the driver may start to move the vehicle without releasing the parking brake. However, even if the driver starts to move the vehicle without releasing the parking brake, the control returns to a normal operation when the vehicle shifts to a running state, whereby the parking brake can be released, thereby preventing occurrence of brake dragging.

The above-described embodiment has been described based on the example in which the disk brake 21 provided with the electric parking brake function is used as the brakes at the left and right rear wheels. However, the present invention is not limited thereto. For example, the disk brake 21 provided with the electric parking brake function may be used as the brakes of all wheels (all of the four wheels).

Further, the above-described embodiment has been described based on the example in which the brake apparatus is embodied by the hydraulic disk brake 21 provided with the electric parking brake. However, the present invention is not limited thereto. For example, the brake apparatus may be embodied by an electric disk brake that does not require supply of a hydraulic pressure. Further, the brake apparatus is not limited to the brake apparatus of the disk brake type. For example, the brake apparatus may be embodied by a brake apparatus of a drum brake type. Further, for example, the brake apparatus may be embodied by a drum-in disk brake in which a drum-type electric parking brake is provided to a disk brake.

According to the above-described embodiment, it is possible to prevent occurrence of brake dragging.

More specifically, the control apparatus is configured to actuate the electric mechanism so as to release holding of braking when the vehicle is in a running state. Therefore, when the vehicle shifts to a running state while the braking state by the electric mechanism is still the holding state, the electric actuator is actuated so as to release holding of braking. Further, similarly, when the braking state by the electric mechanism is a release uncompleted state or a holding uncompleted state, the electric mechanism is actuated so as to release holding of braking if the vehicle is in a running state. Therefore, it is possible to prevent occurrence of brake dragging, thereby preventing generation of uneven wear of the fiction member (the lining) and a reduction in fuel efficiency.

According to the above-described embodiment, if the braking state by the electric mechanism is not the holding state when the system is started up, the control apparatus is configured to actuate the electric mechanism so as to hold braking, provided that the brake pedal is operated at that moment. Therefore, it is possible to actuate the electric mechanism so as to meet the driver's intention to maintain the vehicle in a stopped (parked) state.

According to the brake system of the present invention, it is possible to prevent occurrence of brake dragging.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2012-287022 filed on Dec. 28, 2012.

The entire disclosure of Japanese Patent Application No. 2012-287022 filed on Dec. 28, 2012 including specification, claims, drawings and summary are incorporated herein by reference in its entirety.

What is claimed is:

1. A brake system comprising:
   a brake apparatus capable of holding or releasing braking of a vehicle by an electric mechanism according to a braking request signal; and
   a control apparatus configured to drivingly control the electric mechanism by a power source of the vehicle and, when the brake system stops due to a reduction in voltage of the power source, store at least a braking state that indicates the holding or the release of the braking by the electric mechanism,
   wherein:
   when the brake system is restarted after the brake system stops,
   upon determining by vehicle speed that the vehicle is in a running state, the control apparatus controls the electric mechanism so as to release the holding of the braking based on the stored braking state, and
   upon determining by vehicle speed that the vehicle is in a stopped state, the control apparatus controls the electric mechanism so as to hold the braking based on the stored braking state.

2. The brake system according to claim 1, wherein the control apparatus controls actuation of the electric mechanism so as to release the holding of the braking if the control apparatus determines that the vehicle is in the running state and the braking state by the electric mechanism is not stored as a release state.

3. The brake system according to claim 2, wherein the braking state by the electric mechanism that is not stored as the release state includes one of:
   the braking state by the electric mechanism that is stored as a holding state; and
   the braking state by the electric mechanism that is stored as an unknown state in which the control apparatus cannot determine whether the braking state by the electric mechanism is the holding state or the release state due to a termination of an operation for holding or releasing the braking by the electric mechanism in the middle of the operation.

4. The brake system according to claim 1, wherein the control apparatus controls actuation of the electric mechanism so as to hold the braking if the braking state by the electric mechanism is not stored as the holding state and the vehicle is stopped.

5. The brake system according to claim 4, wherein the braking state by the electric mechanism that is not stored as the holding state includes one of:
   the braking state by the electric mechanism that is stored as the release state; and
   the braking state by the electric mechanism that is stored as an unknown state in which the control apparatus cannot determine whether the braking state by the electric mechanism is the holding state or the release state due to a termination of an operation for holding or releasing the braking by the electric mechanism in the middle of the operation.

6. The brake system according to claim 1, wherein the control apparatus controls actuation of the electric mechanism so as to hold the braking if the braking state by the electric mechanism is not stored as the holding state and the brake pedal is operated at that moment.

7. The brake system according to claim 6, wherein the braking state by the electric mechanism that is not stored as the holding state includes one of:
   the braking state by the electric mechanism that is stored as the release state; and
   the braking state by the electric mechanism that is stored as an unknown state in which the control apparatus cannot determine whether the braking state by the electric mechanism is the holding state or the release state due to a termination of an operation for holding or releasing the braking by the electric mechanism in the middle of the operation.

8. A brake system comprising:
   a brake apparatus capable of advancing a piston by an electric motor according to a braking request signal and holding or releasing braking of a vehicle by a piston holding mechanism configured to hold the advanced piston; and
   a control apparatus configured to drivingly control the electric motor by electric power supplied from a power source of the vehicle and, when the brake system stops due to a reduction in voltage of the power source, store at least a holding state in which the piston is held by the piston holding mechanism, or a release state in which the piston is released by the piston holding mechanism, wherein:
   when the brake system is restarted after the brake system stops,
   if a running state in which a speed of the vehicle is higher than 0 km/h is maintained for a predetermined time period and a braking state by the piston holding mechanism is stored as another state than the release state, the control apparatus controls actuation of the piston holding mechanism so as to release holding of the piston, and
   if the braking state by the piston holding mechanism is not stored as the holding state and the vehicle is in a stopped state, the control apparatus controls actuation of the piston holding mechanism so as to hold the braking.

9. The brake system according to claim 8, wherein the braking state by the piston holding mechanism that is stored as the other state than the release state includes one of:
   the braking state by the piston holding mechanism that is stored as the holding state; and
   the braking state by the piston holding mechanism that is stored as an unknown state in which the control apparatus cannot determine whether the braking state by the piston holding mechanism is the holding state or the release state due to a termination of an operation for holding or releasing the braking by the piston holding mechanism in the middle of the operation.

10. The brake system according to claim 8, wherein the control apparatus actuates the piston holding mechanism so as to hold the braking if the braking state by the piston holding mechanism is not stored as the holding state and the brake pedal is operated at that moment.

11. The brake system according to claim 10, wherein the braking state by the piston holding mechanism that is not stored as the holding state includes:
   the braking state by the piston holding mechanism that is stored as the release state; and
   the braking state by the piston holding mechanism that is stored as an unknown state in which the control apparatus cannot determine whether the braking state by the piston holding mechanism is the holding state or the release state due to a termination of an operation for holding or releasing the braking by the piston holding mechanism in the middle of the operation.

12. A brake system comprising:
   a caliper configured to press brake pads against a disk, the brake pads being provided at both surfaces of the disk rotatable together with a wheel of a vehicle, with use of a piston by a hydraulic pressure based on an operation performed on a brake pedal;
   a piston holding mechanism mounted in the caliper and configured to advance the piston by an electric motor and hold or release the advanced piston; and
   a control apparatus configured to drivingly control the electric motor by electric power supplied from a power source of the vehicle and, when the brake system stops due to a reduction in voltage of the power source, store at least a holding state in which the piston is held by the piston holding mechanism, or a release state in which the piston is released by the piston holding mechanism, wherein:
   when the brake system is restarted after the brake system stops,
   if a running state in which a speed of the vehicle is higher than 0 km/h is maintained for a predetermined time period and a braking state by the piston holding mechanism is stored as another state than the release state, the control apparatus controls actuation of the piston holding mechanism so as to release holding of the piston based on the stored braking state, and
   if the braking state by the piston holding mechanism is not stored as the holding state and the vehicle is in a stopped state, the control apparatus controls actuation of the piston holding mechanism so as to hold the braking based on the stored braking state.

13. The brake system according to claim 12, wherein the braking state by the piston holding mechanism that is stored as the other state than the release state includes one of:
   the braking state by the piston holding mechanism that is stored as the holding state; and
   the braking state by the piston holding mechanism that is stored as an unknown state in which the control apparatus cannot determine whether the braking state by the piston holding mechanism is the holding state or the release state due to a termination of an operation for holding or releasing the braking by the piston holding mechanism in the middle of the operation.

14. The brake system according to claim 12, wherein the control apparatus actuates the piston holding mechanism so as to hold the braking if the braking state by the piston holding mechanism is not stored as the holding state and the brake pedal is operated at that moment.

15. The brake system according to claim 14, wherein the braking state by the piston holding mechanism that is not stored as the holding state includes one of:
- the braking state by the piston holding mechanism that is stored as the release state; and
- the braking state by the piston holding mechanism that is stored as an unknown state in which the control apparatus cannot determine whether the braking state by the piston holding mechanism is the holding state or the release state due to a termination of an operation for holding or releasing the braking by the piston holding mechanism in the middle of the operation.

* * * * *